US011915648B2

(12) United States Patent
Lu et al.

(10) Patent No.: US 11,915,648 B2
(45) Date of Patent: Feb. 27, 2024

(54) DISPLAY APPARATUS AND DRIVING METHOD THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Xu Lu, Beijing (CN); Wen Xu, Beijing (CN); Lianbin Liu, Beijing (CN); Lingyuan Zeng, Beijing (CN); Hui Wen, Beijing (CN); Zhaolun Liu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 26 days.

(21) Appl. No.: 17/778,888

(22) PCT Filed: Feb. 19, 2021

(86) PCT No.: PCT/CN2021/076860

§ 371 (c)(1),
(2) Date: May 23, 2022

(87) PCT Pub. No.: WO2021/164732

PCT Pub. Date: Aug. 26, 2021

(65) Prior Publication Data

US 2023/0005423 A1 Jan. 5, 2023

(30) Foreign Application Priority Data

Feb. 19, 2020 (CN) ......................... 202010102890.2

(51) Int. Cl.
*G09G 3/3233* (2016.01)

(52) U.S. Cl.
CPC ... *G09G 3/3233* (2013.01); *G09G 2300/0452* (2013.01); *G09G 2300/0819* (2013.01);
(Continued)

(58) Field of Classification Search
CPC ......... G09G 3/3233; G09G 2300/0452; G09G 2300/0819; G09G 2300/0842;
(Continued)

(56) References Cited

U.S. PATENT DOCUMENTS

2017/0301293 A1 10/2017 Zhu et al.
2017/0330512 A1 11/2017 Zhou
(Continued)

FOREIGN PATENT DOCUMENTS

CN 105989794 A 10/2016
CN 107452334 A 12/2017
(Continued)

OTHER PUBLICATIONS

The First Office Action for the Chinese Patent Application No. 202010102890.2 issued by the Chinese Patent Office dated Oct. 10, 2020.
(Continued)

*Primary Examiner* — Kenneth B Lee, Jr.
(74) *Attorney, Agent, or Firm* — IP & T GROUP LLP

(57) ABSTRACT

A display apparatus includes a display panel and an emission time control chip. The display panel has a plurality of sub-pixels, and each sub-pixel includes a light emitting device, a pixel driving circuit, and an emission time control circuit. The pixel driving circuit is configured to provide a driving signal for driving the light emitting device to emit light. The emission time control circuit is configured to connect the pixel driving circuit to the light emitting device in response to an emission control signal to control a duration of transmission of the driving signal to the light
(Continued)

emitting device. The light emitting time control chip includes at least one output terminal. The emission time control chip is configured to transmit emission time control signals to the light emitting time control circuits of the plurality of sub-pixels through the at least one output terminal.

17 Claims, 12 Drawing Sheets

(52) U.S. Cl.
CPC ............... *G09G 2300/0842* (2013.01); *G09G 2300/0861* (2013.01); *G09G 2310/08* (2013.01); *G09G 2320/0247* (2013.01); *G09G 2320/0626* (2013.01)

(58) Field of Classification Search
CPC ....... G09G 2300/0861; G09G 2310/08; G09G 2320/0247; G09G 2320/0626
See application file for complete search history.

(56) References Cited

U.S. PATENT DOCUMENTS

| | | | | |
|---|---|---|---|---|
| 2018/0144687 | A1 | 5/2018 | Lin et al. | |
| 2019/0080645 | A1 | 3/2019 | Chaji | |
| 2019/0385530 | A1 | 12/2019 | Gao et al. | |
| 2020/0074928 | A1 | 3/2020 | Li et al. | |
| 2020/0273411 | A1* | 8/2020 | Gao | G09G 3/3233 |
| 2021/0358390 | A1* | 11/2021 | Yue | G09G 3/32 |
| 2021/0358419 | A1 | 11/2021 | Shen et al. | |
| 2022/0005403 | A1* | 1/2022 | Yue | G09G 3/32 |

FOREIGN PATENT DOCUMENTS

| | | | |
|---|---|---|---|
| CN | 107644613 | A | 1/2018 |
| CN | 108470537 | A | 8/2018 |
| CN | 108877680 | A | 11/2018 |
| CN | 109493744 | A | 3/2019 |
| CN | 110021263 | A | 7/2019 |
| CN | 110047436 | A | 7/2019 |
| CN | 111179836 | A | 5/2020 |

OTHER PUBLICATIONS

The Second Office Action for the Chinese Patent Application No. 202010102890.2 issued by the Chinese Patent Office dated May 7, 2021.

The Third Office Action for the Chinese Patent Application No. 202010102890.2 issued by the Chinese Patent Office dated Sep. 29, 2021.

* cited by examiner

DISPLAY APPARATUS AND DRIVING METHOD THEREOF

CROSS-REFERENCE TO RELATED APPLICATIONS

This application is a national phase entry under 35 USC 371 of International Patent Application No. PCT/CN2021/076860, filed on Feb. 19, 2021, which claims priority to Chinese Patent Application No. 202010102890.2, filed on Feb. 19, 2020, which are incorporated herein by reference in their entirety.

TECHNICAL FIELD

The present disclosure relates to the field of display technologies, and in particular, to a display apparatus and a driving method thereof.

BACKGROUND

Organic light-emitting diode (OLED) display apparatus is one of the current research focuses in the field. OLED display apparatuses have advantages of low power consumption, low production cost, self-luminescence, wide viewing angle, high response speed, etc. compared with liquid crystal display (LCD) apparatuses.

SUMMARY

In an aspect, a display apparatus is provided. The display apparatus includes a display panel and an emission time control chip. The display panel has a plurality of sub-pixels, and each sub-pixel includes a light emitting device, a pixel driving circuit, and an emission time control circuit. The pixel driving circuit is configured to provide a driving signal for driving the light emitting device to emit light. The emission time control circuit is electrically connected between the pixel driving circuit and the light emitting device, and is configured to connect the pixel driving circuit to the light emitting device in response to an emission time control signal, so as to control a duration of transmission of the driving signal to the light emitting device. The emission time control chip includes at least one output terminal, and emission time control circuits of the plurality of sub-pixels are electrically connected to the at least one output terminal. The emission time control chip is configured to transmit emission time control signals to the emission time control circuits of the plurality of sub-pixels through the at least one output terminal, and the emission time control signals are pulse width modulation signals.

In some embodiments, the emission time control circuit includes a first transistor. A gate of the first transistor is electrically connected to a respective one of the at least one output terminal, a first electrode of the first transistor is electrically connected to the pixel driving circuit, and a second electrode of the first transistor is electrically connected to the light emitting device.

In some embodiments, the plurality of sub-pixels include sub-pixels of three colors. The emission time control chip includes three groups of output terminals, each group of output terminals include at least one output terminal, and emission time control circuits of sub-pixels of each color are electrically connected to a respective group of output terminals. The emission time control chip is configured to transmit emission time control signals with different phases to the sub-pixels of different colors through different groups of output terminals.

In some embodiments, the plurality of sub-pixels include a plurality of red sub-pixels, a plurality of green sub-pixels, and a plurality of blue sub-pixels. The emission time control chip is configured to transmit at least one first emission time control signal to the plurality of red sub-pixels through a respective group of output terminals; transmit at least one second emission time control signal to the plurality of green sub-pixels through a respective group of output terminals; and transmit at least one third emission time control signal to the plurality of blue sub-pixels through a respective group of output terminals. In a frame, the first emission time control signal, the second emission time control signal, and the third emission time control signal have a same number of periods, and durations of the periods are equal. In each period, a phase of a first level of the second emission time control signal lags behind a phase of a first level of the first emission time control signal by a first angle, and a phase of a first level of the third emission time control signal lags behind the phase of the first level of the second emission time control signal by a second angle. The first level is a level that enables the emission time control circuit to stop transmitting the driving signal.

In some embodiments, the emission time control chip is configured to transmit emission time control signals with duty cycles that are not exactly the same to the sub-pixels of different colors through the different groups of output terminals.

In some embodiments, where the emission time control chip is configured to transmit at least one first emission time control signal, at least one second emission time control signal, and at least one third emission time control signal, a proportion of the first level of the first emission time control signal is greater than a proportion of the first level of the third emission time control signal, and is less than a proportion of the first level of the second emission time control signal. The first level is a level that enables the emission time control sub-circuit to stop transmitting the driving signal.

In some embodiments, the plurality of sub-pixels are arranged in an array. The display panel further includes a plurality of emission time control lines located between a plurality of columns of sub-pixels, and sub-pixels of a same color located in a same column of sub-pixels are electrically connected to a respective output terminal through a same emission time control line; or the display panel further includes a plurality of emission time control lines located between a plurality of rows of sub-pixels, and sub-pixels of a same color located in a same row of sub-pixels are electrically connected to a respective output terminal through a same emission time control line.

In some embodiments, the emission time control chip includes three output terminals, and each group of output terminals include an output terminal. The emission time control chip is configured to transmit the emission time control signals to the sub-pixels of different colors through the different output terminals.

In some embodiments, the display panel further includes a data voltage terminal, a scan signal terminal, a first voltage terminal, and an emission control signal terminal. The pixel driving circuit includes a writing sub-circuit, a driving sub-circuit, and an emission control sub-circuit. The writing sub-circuit is electrically connected to the driving sub-circuit, the data voltage terminal, and the scan signal terminal, and is configured to write a data signal from the data voltage terminal into the driving sub-circuit in response to a scan signal from the scan signal terminal to perform a compensation of a threshold voltage on the driving sub-circuit. The driving sub-circuit is electrically connected to the emission control sub-circuit and the first voltage terminal, and is configured to output the driving signal according to the data signal written into the driving sub-circuit and a first voltage signal from the first voltage terminal in response to the emission control sub-circuit. The emission control sub-circuit is electrically connected to the emission control signal terminal, the first voltage terminal, and the emission time control circuit, and is configured to: in response to an emission control signal from the emission control signal terminal, connect the first voltage terminal to the driving sub-circuit and connect the driving sub-circuit to the emission time control circuit. The emission time control circuit is electrically connected to the emission control sub-circuit, and is configured to connect the emission control sub-circuit to the light emitting device in response to the emission time control signal.

In some embodiments, the writing sub-circuit includes a second transistor and a third transistor, the driving sub-circuit includes a driving transistor and a storage capacitor, and the emission control sub-circuit includes a fourth transistor and a fifth transistor. The emission time control circuit includes a first transistor. A gate of the second transistor is electrically connected to the scan signal terminal, a first electrode of the second transistor is electrically connected to the data voltage terminal, and a second electrode of the second transistor is electrically connected to a first electrode of the driving transistor; a gate of the third transistor is electrically connected to the scan signal terminal, a first electrode of the third transistor is electrically connected to a second electrode of the driving transistor, and a second electrode of the third transistor is electrically connected to a gate of the driving transistor; the gate of the driving transistor is electrically connected to a first electrode of the storage capacitor, the first electrode of the driving transistor is electrically connected to a second electrode of the fourth transistor, and the second electrode of the driving transistor is electrically connected to a first electrode of the fifth transistor; a second electrode of the storage capacitor is electrically connected to the first voltage terminal; a gate of the fourth transistor is electrically connected to the emission control signal terminal, and a first electrode of the fourth transistor is electrically connected to the first voltage terminal; a gate of the fifth transistor is electrically connected to the emission control signal terminal, and a second electrode of the fifth transistor is electrically connected to a first electrode of the first transistor.

In some embodiments, the pixel driving circuit further includes a first reset sub-circuit and a second reset sub-circuit, and the display panel further includes an initial voltage terminal and a reset signal terminal. The first reset sub-circuit is electrically connected to the reset signal terminal, the initial voltage terminal, and the light emitting device, and is configured to transmit an initial voltage signal from the initial voltage terminal to the light emitting device in response to a reset signal from the reset signal terminal. The second reset sub-circuit is electrically connected to the reset signal terminal, the initial voltage terminal, and the driving sub-circuit, and is configured to transmit the initial voltage signal to the driving sub-circuit in response to the reset signal.

In some embodiments, the driving sub-circuit includes a driving transistor and a storage capacitor, and the first reset sub-circuit includes a sixth transistor. A gate of the sixth transistor is electrically connected to the reset signal terminal, a first electrode of the sixth transistor is electrically connected to the initial voltage terminal, and a second electrode of the sixth transistor is electrically connected to the light emitting device. The second reset sub-circuit includes a seventh transistor. A gate of the seventh transistor is electrically connected to the reset signal terminal, a first electrode of the seventh transistor is electrically connected to the initial voltage terminal, and a second electrode of the seventh transistor is electrically connected to a gate of the driving transistor.

In another aspect, a driving method of the above display apparatus is provided. The driving method includes: in a frame: transmitting, by the pixel driving circuit, driving signals to light emitting devices of the plurality of sub-pixels according to image data of an image to be displayed; and transmitting, by the emission time control chip, the emission time control signals to the emission time control circuits of the plurality of sub-pixels, so as to control durations of transmission of the driving signals to the light emitting devices of the plurality of sub-pixels. The emission time control signals are pulse width modulation signals.

In some embodiments, the emission time control signals each have first levels and second levels that are alternatively arranged. The first levels are each a level that enables the emission time control circuit to stop transmitting the driving signal, and the second levels are each a level that enables the emission time control circuit to transmit the driving signal. The plurality of sub-pixels include sub-pixels of three colors. Transmitting, by the emission time control chip, the emission time control signals to the emission time control circuits of the plurality of sub-pixels includes: transmitting, by the emission time control chip, the emission time control signals with different phases to the sub-pixels of different colors.

In some embodiments, the plurality of sub-pixels include a plurality of red sub-pixels, a plurality of green sub-pixels, and a plurality of blue sub-pixels. Transmitting, by the emission time control chip, the emission time control signals with different phases to the sub-pixels of different colors includes: transmitting at least one first emission time control signal to the plurality of red sub-pixels; transmitting at least one second emission time control signal to the plurality of green sub-pixels; and transmitting at least one third emission time control signal to the plurality of blue sub-pixels. In a frame, the first emission time control signal, the second emission time control signal, and the third emission time control signal have the same number of periods, durations of the periods are equal, and each period includes a first level period for outputting a first level and a second level period for outputting a second level. A phase of a first level period of the second emission time control signal lags behind a phase of a first level period of the first emission time control signal by a first angle, and a phase of a first level period of the third emission time control signal lags behind the phase of the first level period of the second emission time control signal by a second angle.

In some embodiments, a sum of a duration of the first angle, a duration of the second angle, and a duration of the first level period of the third emission time control signal is equal to the duration of the period. In a frame, the first emission time control signal, the second emission time control signal, and the third emission time control signal each have K periods, K is a constant related to a resolution of the display apparatus, and K is a positive integer.

In some embodiments, the emission time control signals transmitted to the sub-pixels of different colors have the first levels with the proportions that are not exactly the same.

In some embodiments, the at least one first emission time control signal is transmitted to the plurality of red sub-pixels, the at least one second emission time control signal is transmitted to the plurality of green sub-pixels, and the at least one third emission time control signal is transmitted to the plurality of blue sub-pixels, a proportion of a first level of the first emission time control signal is greater than a proportion of a first level of the third emission time control signal, and is less than a proportion of a first level of the second emission time control signal.

In some embodiments, the display panel further includes a data voltage terminal, a scan signal terminal, a first voltage terminal, an emission control signal terminal, an initial voltage terminal, and a reset signal. The pixel driving circuit of each sub-pixel includes a writing sub-circuit, a driving sub-circuit, an emission control sub-circuit, a first reset sub-circuit, and a second reset sub-circuit. The writing sub-circuit is electrically connected to the driving sub-circuit, the data voltage terminal, and the scan signal terminal. The driving sub-circuit is electrically connected to the emission control sub-circuit and the first voltage terminal. The emission control sub-circuit is electrically connected to the emission control signal terminal, the first voltage terminal, and the emission time control circuit. The first reset sub-circuit is electrically connected to the reset signal terminal, the initial voltage terminal, and the light emitting device of the sub-pixel. The second reset sub-circuit is electrically connected to the reset signal terminal, the initial voltage terminal, and the driving sub-circuit. In a frame, each sub-pixel has a reset period, a scanning period, and a light emitting period in sequence. Transmitting, by the pixel driving circuits, the driving signals to the light emitting devices of the plurality of sub-pixels according to the image data of the image to be displayed includes: in the reset period, transmitting, by the first reset sub-circuit, an initial voltage from the initial voltage terminal to the light emitting device in response to a reset signal from the reset signal terminal, and transmitting, by the second reset sub-circuit, the initial voltage to the driving sub-circuit in response to the reset signal; in the scanning period, writing, by the writing sub-circuit, a data signal from the data voltage terminal into the driving sub-circuit in response to a scan signal from the scan signal terminal to perform a compensation of a threshold voltage compensation on the driving sub-circuit; and in the light emitting period, in response to an emission control signal from the emission control signal terminal, connecting, by the emission control sub-circuit, the first voltage terminal to the driving sub-circuit, and the driving sub-circuit to the emission time control circuit; and outputting, by the driving sub-circuit, the driving signal according to the data signal written into the driving sub-circuit and a first voltage signal from the first voltage terminal in response to the emission control sub-circuit. A duration of an off level of the emission control signal is greater than or equal to 2H, and H represents a duration required by the sub-pixel to write the data signal.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to."

In the description of the specification, the terms such as "some embodiments", "exemplary embodiments", "example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first" and "second" are only used for descriptive purposes, and are not to be construed as indicating or implying relative importance or implicitly indicating the number of indicated technical features. Thus, features defined as "first" and "second" may explicitly or implicitly include one or more of the features. In the description of the embodiments of the present disclosure, the term "a plurality of/the plurality of" means two or more unless otherwise specified.

In the description of some embodiments, the terms "connected" and "electrically connected" and derivatives thereof may be used. For example, the term "connected" may be used in the description of some embodiments to indicate that two or more components are in direct physical or electrical contact with each other.

The phrase "A and/or B" herein includes the following three combinations: only A, only B, and a combination of A and B.

Figure 1:
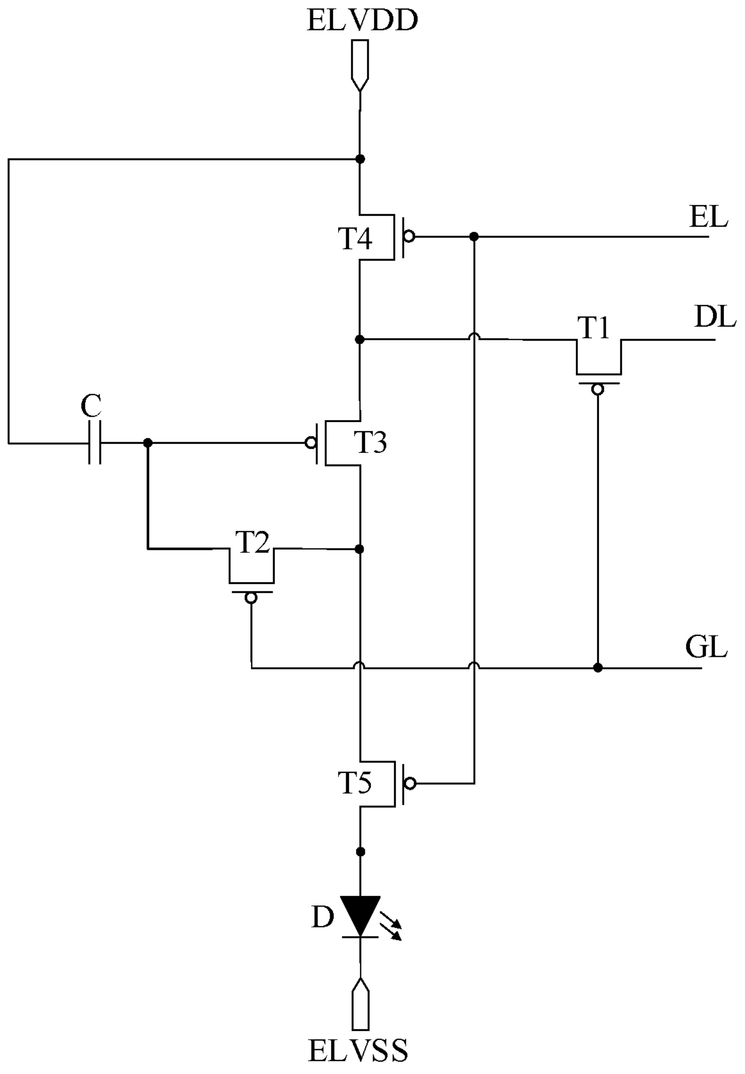
FIG. 1 is an equivalent circuit diagram of a pixel driving circuit in the related art.
Figure 2:
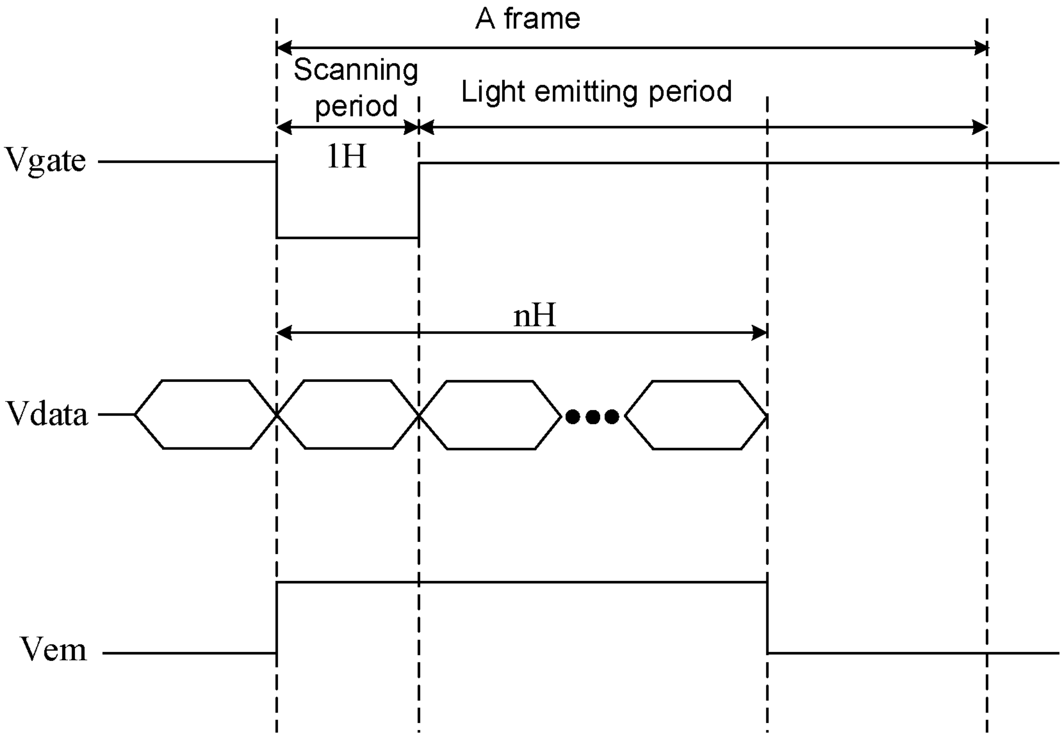
FIG. 2 is a signal timing diagram of the pixel driving circuit shown in FIG. 1.

In the field of display technologies, OLED display apparatuses have the advantages of low power consumption, low production cost, self-luminescence, wide viewing angle, high response speed, etc. In the related art, an OLED display apparatus has a plurality of sub-pixels, and each sub-pixel includes a pixel driving circuit and a light emitting device D. As shown in FIG. 1, the pixel driving circuit of the sub-pixel may include a first transistor T1 to a fifth transistor T5 (here all of them being P-type transistors is taken as an example), and a capacitor C. Referring to the signal timing shown in FIG. 2, in a frame, a process of driving the light emitting device D by the pixel driving circuit to emit light includes a scanning period and a light emitting period. In the scanning period, the first transistor T1 and the second transistor T2 write a data signal Vdata transmitted through a data voltage terminal DL into the capacitor C in response to a scan signal Vgate from a scan signal line GL. In the light emitting period, the fourth transistor T4 and the fifth transistor T5 connect a first voltage terminal ELVDD to the light emitting device D in response to an emission control signal Vem from an emission control line EL, so that the third transistor T3 drives the light emitting device D to emit light.

It will be noted that, in the scanning period, time required by the sub-pixel to write the data signal Vdata is 1H, that is, a duration of a low level of the scan signal Vgate is 1H. In this case, a duration of an off level of the emission control signal Vem is at least 1H, which may ensure that the fourth transistor T4 and the fifth transistor T5 are maintained in an off state during the scanning period. Here, the emission control signal Vem generally has high levels and low levels (referring to FIG. 2), and the off level of the emission control signal Vem refers to a level that enables the fourth transistor T4 and the fifth transistor T5 to be in the off state. For example, in a case where the fourth transistor T4 and the fifth transistor T5 are P-type transistors as shown in FIG. 1, the off level of the emission control signal Vem refers to the high level of the emission control signal Vem.

In addition, an off level of a certain signal described below refers to a level of the signal that enables a corresponding transistor to be in the off state; and similarly, an on level of a certain signal described below refers to a level of the signal that enables a corresponding transistor to be in an on state.

In the light emitting period, a duration in which the emission control signal Vem is at a high level may be changed, which may control the time during which the fourth transistor T4 and the fifth transistor T5 are in the off state in the light emitting period. That is, the time during which the first voltage terminal ELVDD is connected to the light emitting device D may be controlled, so that the time during which the third transistor T3 drives the light emitting device D to emit light may be controlled. For example, in a case where the duration of the high level of the emission control signal Vem is increased from 1H to nH (n is an integer greater than 1), the time during which the light emitting device D emits light is shortened, so that brightness of the sub-pixel may be reduced.

It will also be noted that, the emission control signals Vem for sub-pixels in different rows usually have the same waveform. For example, the emission control signals Vem may be shifted and registered by row driving circuits of the display panel, so as to realize row-by-row transmission. On this basis, an overall brightness of a screen may be controlled by controlling durations of the off levels of the emission control signals Vem. However, if durations of the off levels of the emission control signals Vem are relatively long so that the screen has relatively low brightness, there are many rows of sub-pixels in a non-light emitting state at the same time, resulting in continuous rows of sub-pixels in the non-light emitting state in the screen. As a result, bright and dark stripes may appear on the screen, which causes flickering of the screen. For example, in a case where a display apparatus with low screen brightness is photographed by a camera, the screen of the display apparatus in the photographed image may have bright and dark stripes.

Figure 3:
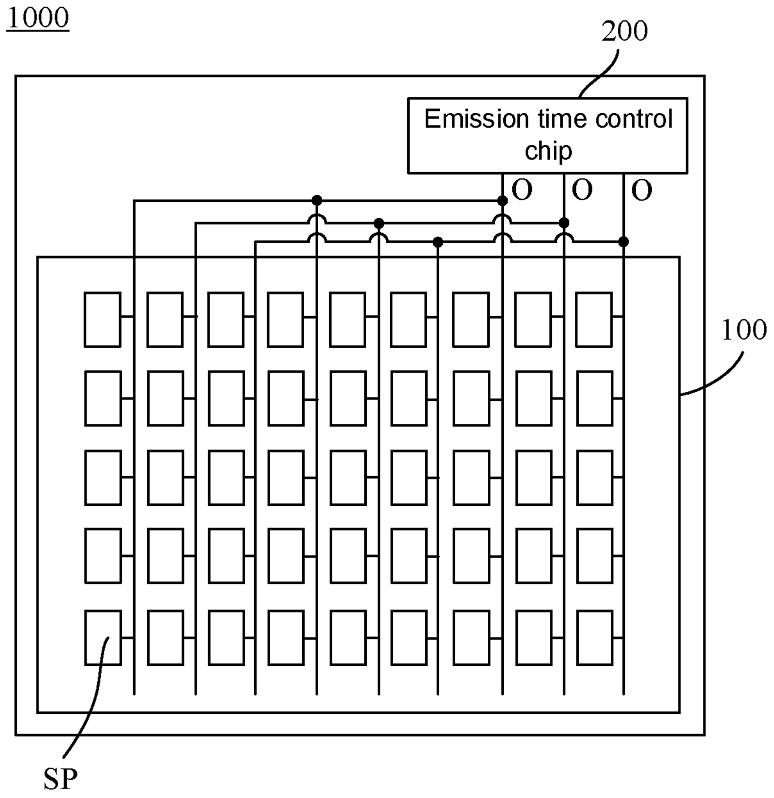
FIG. 3 is a schematic top view of a display apparatus, in accordance with some embodiments.

As shown in FIG. 3, some embodiments of the present disclosure provide a display apparatus 1000, and the display apparatus 1000 includes a display panel 100 and an emission time control chip 200.

Figure 4:
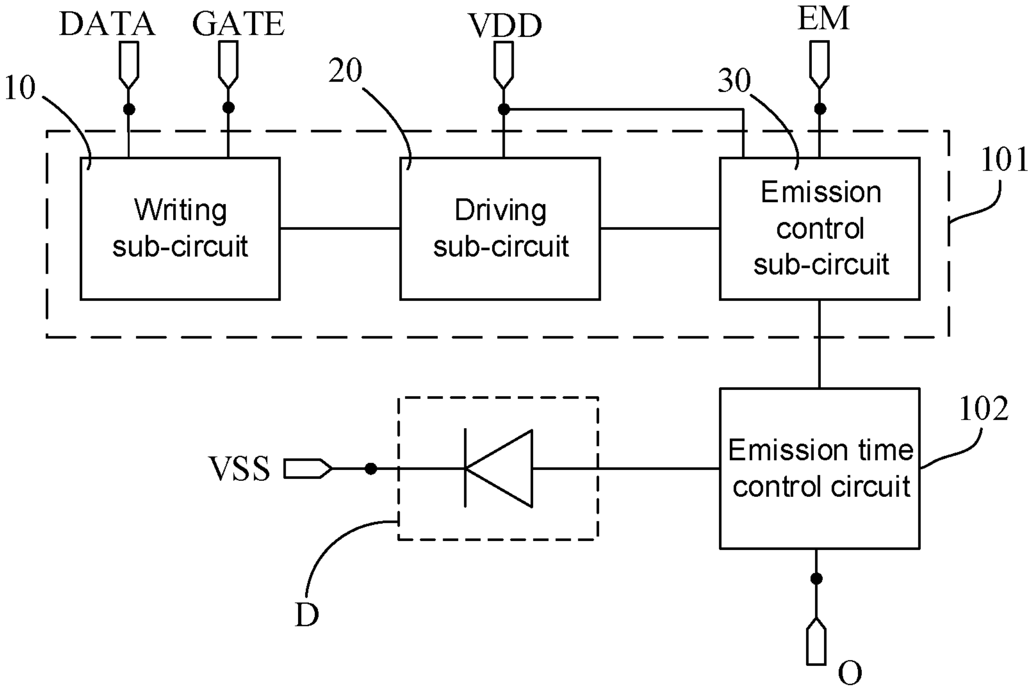
FIG. 4 is a schematic diagram showing circuits included in a sub-pixel, in accordance with some embodiments.

The display panel 100 has a plurality of sub-pixels SP. Referring to FIG. 4, each sub-pixel SP includes a light emitting device D, a pixel driving circuit 101, and an emission time control circuit 102. The pixel driving circuit 101 is configured to provide a driving signal SD for driving the light emitting device D to emit light. The emission time control circuit 102 is electrically connected between the pixel driving circuit 101 and the light emitting device D, and is configured to connect the pixel driving circuit 101 to the light emitting device D in response to an emission time control signal Vemt from the emission time control chip 200, so as to control a duration of transmission of the driving signal SD to the light emitting device D.

Figure 6:
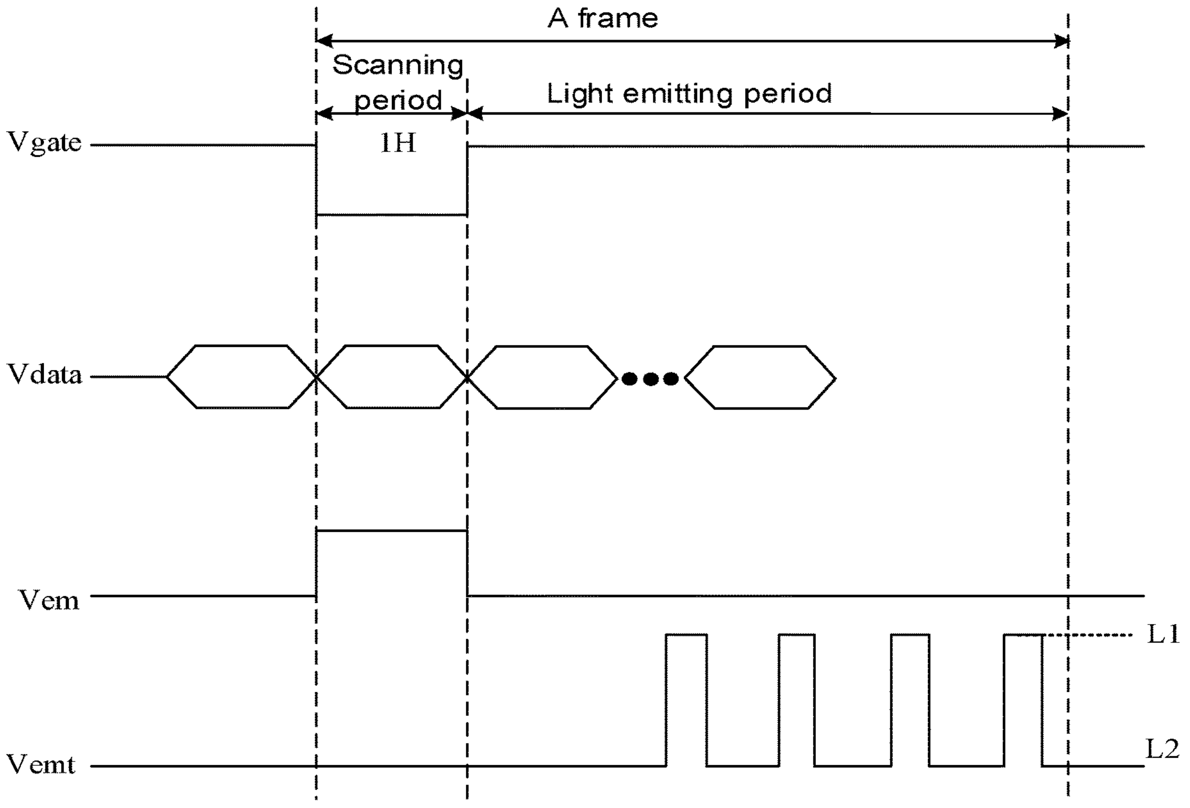
FIG. 6 is a schematic timing diagram showing signals, in accordance with some embodiments.

Referring to FIGS. 3 and 4, the emission time control chip 200 includes at least one output terminal O, and emission time control circuits 102 of the plurality of sub-pixels SP are electrically connected to the at least one output terminal O. The emission time control chip 200 is configured to transmit emission time control signal(s) Vemt to the emission time control circuits 102 of the plurality of sub-pixels SP through the at least one output terminal O. As shown in FIG. 6, the emission time control signal Vemt is a pulse width modulation (PWM) signal.

It will be understood that any existing chip or circuit structure capable of generating the PWM signal may be used as the emission time control chip 200.

In the display apparatus 1000, a proportion of a first level L1 (i.e., a level at which the transmission of the driving signal SD to the light emitting device D is stopped) of the emission time control signal Vemt transmitted by the emission time control chip 200 to the emission time control circuit 102 is adjusted, that is, a pulse width of the PWM signal is adjusted, so that the emission time control circuit 102 may adjust the emission time of the sub-pixel SP. As a result, luminous brightness of the sub-pixel may be adjusted. In this case, there is no need to control the brightness of the screen by changing the duration of the off level of the emission control signal Vem. Therefore, it may be possible to avoid a case where the duration of the off level of the emission control signal Vem is made relatively long to achieve the relatively low screen brightness. In this way, the number of rows of sub-pixels that are in the non-light emitting state at the same time may be reduced, thereby preventing the bright and dark stripes and flickering from occurring with the screen, which may prevent the bright and dark stripes from occurring on a screen in a photographed picture in a case where the display apparatus 1000 having the relatively low screen brightness is photographed by a camera.

It will be understood that the emission time control signal Vemt (i.e., the PWM signal) includes first levels L1 and second levels L2 that are alternatively arranged (referring to FIG. 6). Here, the first level L1 is a level that enables the emission time control circuit 102 to stop transmitting the driving signal SD to the light emitting device D, and the second level L2 is a level that enables the emission time control circuit 102 to transmit the driving signal SD to the light emitting device D. In a case where the emission time control circuit 102 includes a transistor, the first level L1 of the emission time control signal Vemt refers to an off level of the transistor, and the second level L2 refers to an on level of the transistor. In addition, in the signal timing shown in FIG. 6, the first level L1 corresponds to a pulse portion of the PWM signal.

In some embodiments, referring to FIGS. 3 and 4, the display panel 100 further includes a data voltage terminal DATA, a scan signal terminal GATE, a first voltage terminal VDD, and an emission control signal terminal EM. The pixel driving circuit 101 includes a writing sub-circuit 10, a driving sub-circuit 20, and an emission control sub-circuit 30.

The writing sub-circuit 10 is electrically connected to the driving sub-circuit 20, the data voltage terminal DATA and the scan signal terminal GATE, and is configured to write a data signal Vdata from the data voltage terminal DATA into the driving sub-circuit 20 in response to a scan signal Vgate from the scan signal terminal GATE to perform a compensation of a threshold voltage on the driving sub-circuit 20.

The driving sub-circuit 20 is electrically connected to the emission control sub-circuit 30 and the first voltage terminal VDD, and is configured to output, in response to connecting the first voltage terminal VDD to the driving sub-circuit 20 and connecting the driving sub-circuit 20 to the emission time control circuit 102 by the emission control sub-circuit 30, the driving signal SD according to the data signal Vdata written into the driving sub-circuit 20 and a first voltage signal Vdd from the first voltage terminal VDD.

The emission control sub-circuit 30 is electrically connected to the emission control signal terminal EM, the first voltage terminal VDD, and the emission time control circuit 102, and is configured to: in response to an emission control signal Vem from the emission control signal terminal EM, connect the first voltage terminal VDD to the driving sub-circuit 20 and connect the driving sub-circuit 20 to the emission time control circuit 102.

Based on this, the emission time control circuit 102 is electrically connected to the emission control sub-circuit 30, and is configured to connect the emission control sub-circuit 30 to the light emitting device D in response to the emission time control signal Vemt.

Here, the light emitting device D may have a first electrode and a second electrode. For example, the first electrode of the light emitting device D may be an anode, and the second electrode of the light emitting device D may be a cathode. For example, referring to FIG. 4, the emission time control circuit 102 is electrically connected to the anode of the light emitting device D, and the cathode of the light emitting device D is electrically connected to a second voltage terminal VSS. The second voltage terminal VSS may be a common voltage terminal of the display panel 100, and may output a second voltage signal Vss with a substantially constant voltage value for ensuring a normal operation of the light emitting device D.

Figure 5:
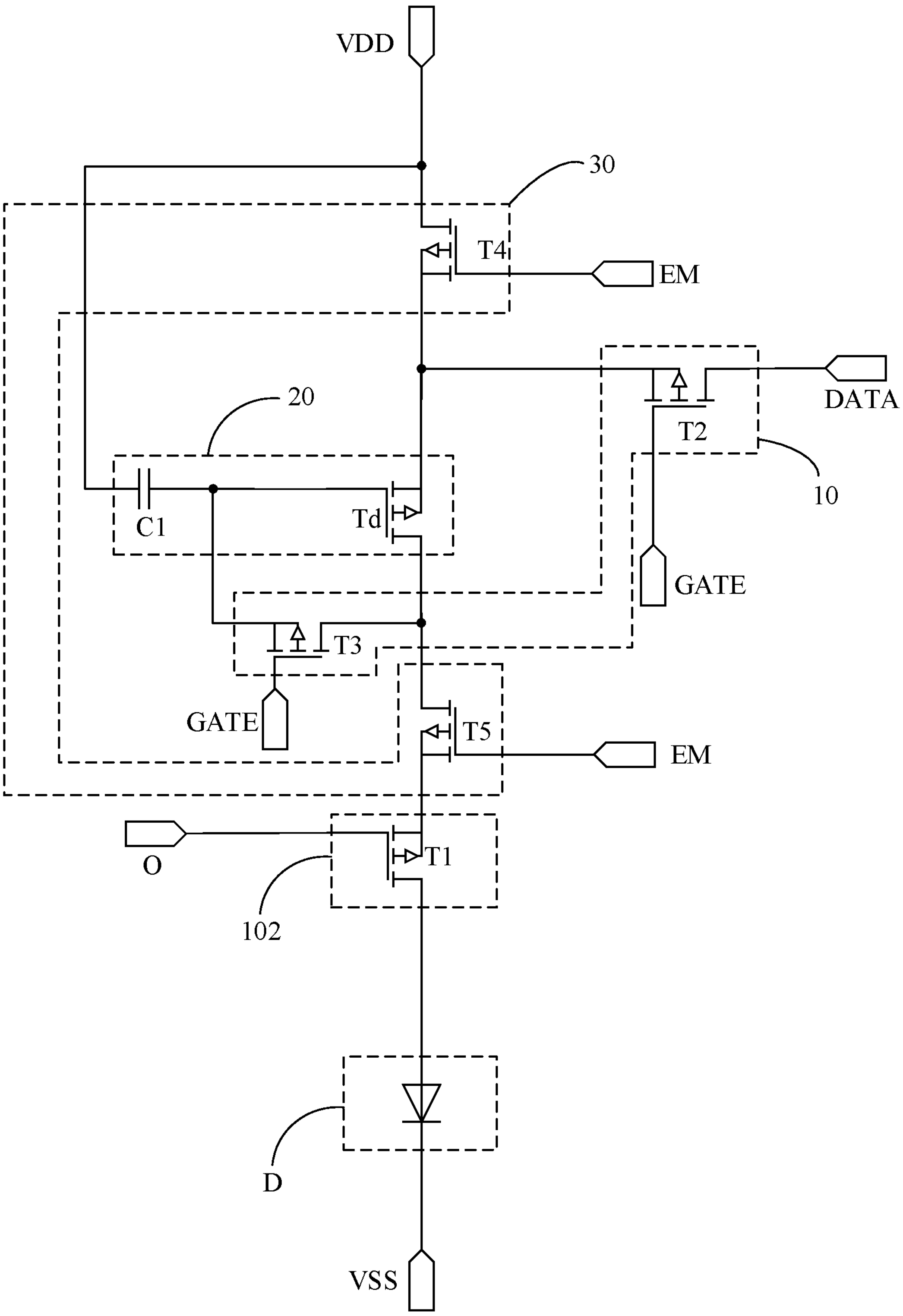
FIG. 5 is a schematic diagram showing circuits included in another sub-pixel, in accordance with some embodiments.

In some embodiments, as shown in FIG. 5, the emission time control circuit 102 includes a first transistor T1. A gate of the first transistor T1 is electrically connected to the output terminal O of the emission time control chip 200, a first electrode of the first transistor T1 is electrically connected to the emission control sub-circuit 30 of the pixel driving circuit 101, and a second electrode of the first transistor T1 is electrically connected to a first electrode of the light emitting device D.

Based on this, for example, as shown in FIG. 5, the driving sub-circuit 20 includes a driving transistor Td and a storage capacitor C1. The writing sub-circuit 10 includes a second transistor T2 and a third transistor T3. The emission control sub-circuit 30 includes a fourth transistor T4 and a fifth transistor T5.

A gate of the second transistor T2 is electrically connected to the scan signal terminal GATE, a first electrode of the second transistor T2 is electrically connected to the data voltage terminal DATA, and a second electrode of the second transistor T2 is electrically connected to a first electrode of the driving transistor Td.

A gate of the third transistor T3 is electrically connected to the scan signal terminal GATE, a first electrode of the third transistor T3 is electrically connected to a second electrode of the driving transistor Td, and a second electrode of the third transistor T3 is electrically connected to a gate of the driving transistor Td.

The gate of the driving transistor Td is electrically connected to a first electrode of the storage capacitor C1, the first electrode of the driving transistor Td is electrically connected to a second electrode of the fourth transistor T4, and the second electrode of the driving transistor Td is electrically connected to a first electrode of the fifth transistor T5.

A second electrode of the storage capacitor C1 is electrically connected to the first voltage terminal VDD.

A gate of the fourth transistor T4 is electrically connected to the emission control signal terminal EM, and a first electrode of the fourth transistor T4 is electrically connected to the first voltage terminal VDD.

A gate of the fifth transistor T5 is electrically connected to the emission control signal terminal EM, and a second electrode of the fifth transistor T5 is electrically connected to the first electrode of the first transistor T1.

Figure 7:
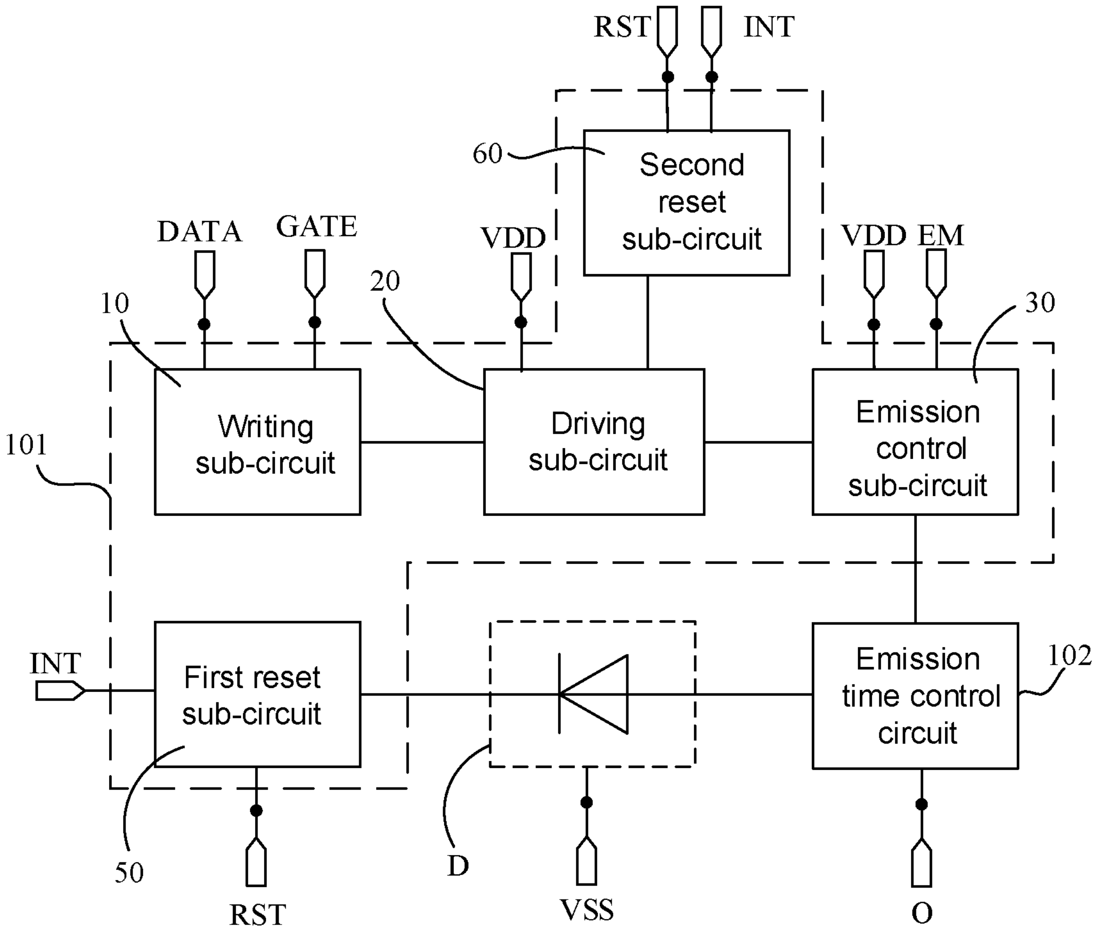
FIG. 7 is a schematic diagram showing circuits included in yet another sub-pixel, in accordance with some embodiments.
Figure 8:
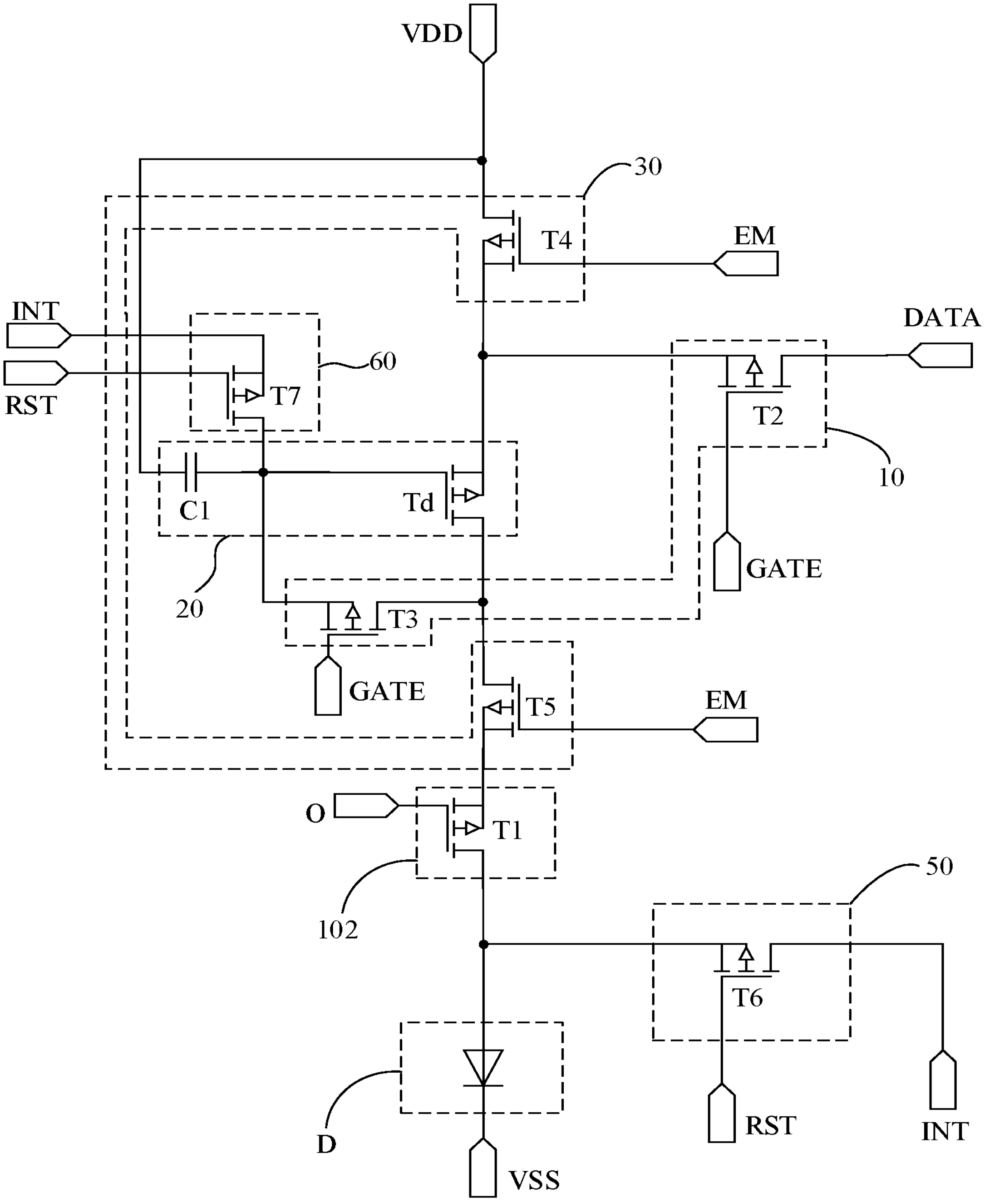
FIG. 8 is a schematic diagram showing circuits included in yet another sub-pixel, in accordance with some embodiments.
Figure 9:
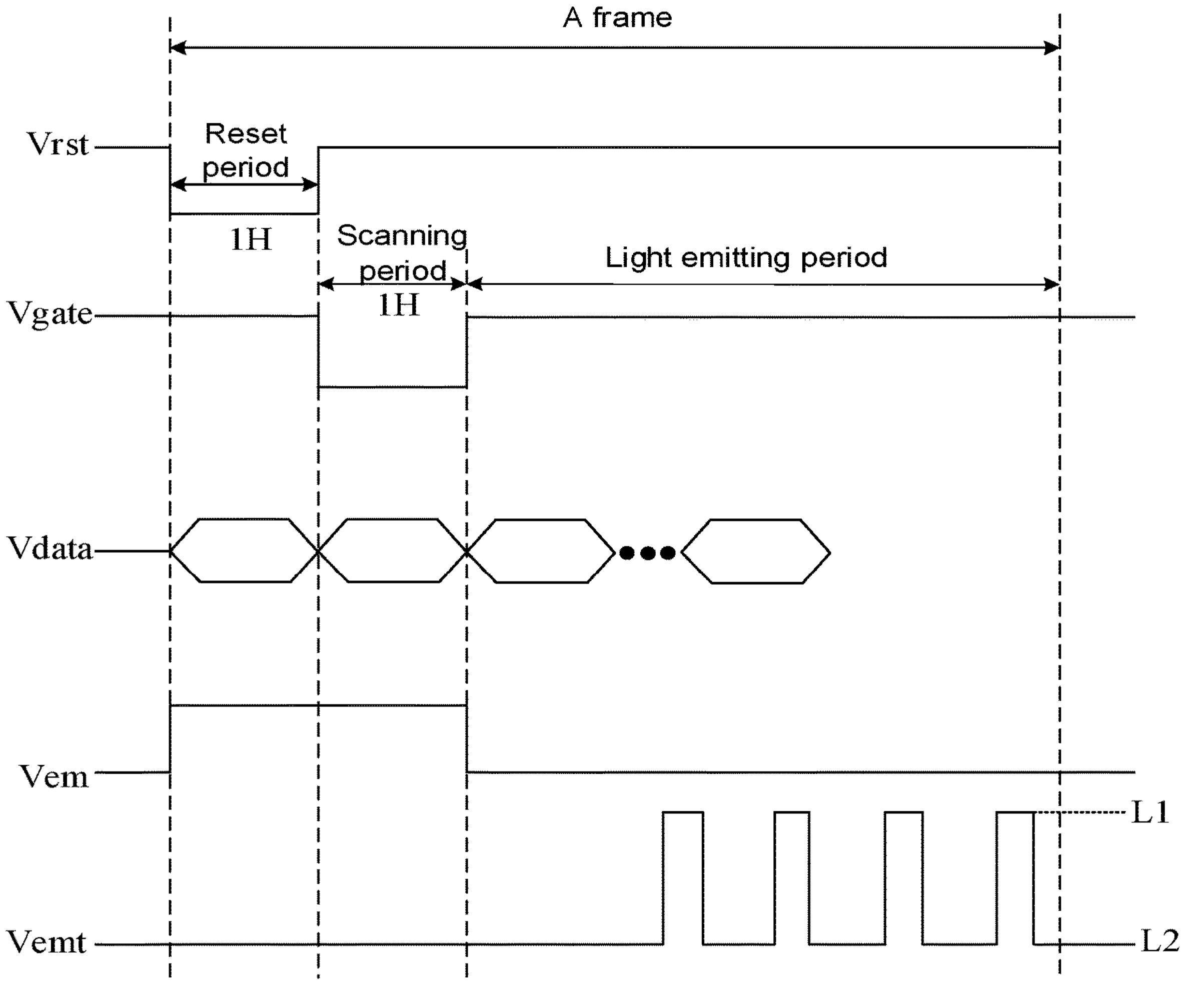
FIG. 9 is a schematic timing diagram showing some other signals, in accordance with some embodiments.

In some embodiments, as shown in FIGS. 7 to 9, the pixel driving circuit 101 further includes a first reset sub-circuit 50 and a second reset sub-circuit 60. The display panel 100 further includes an initial voltage terminal INT and a reset signal terminal RST.

The first reset sub-circuit 50 is electrically connected to the reset signal terminal RST, the initial voltage terminal INT, and the light emitting device D, and is configured to transmit an initial voltage signal Vint of the initial voltage terminal INT to the light emitting device D in response to a reset signal Vrst from the reset signal terminal RST, so as to initialize a voltage of the first electrode of the light emitting device D. In this case, the first reset sub-circuit 50 initializes the voltage of the first electrode of the light emitting device D, which is beneficial to suppress the aging of the light emitting device D and extend a service life of the display apparatus.

The second reset sub-circuit 60 is electrically connected to the reset signal terminal RST, the initial voltage terminal INT, and the driving sub-circuit 20, and is configured to transmit the initial voltage signal Vint to the driving sub-circuit 20 in response to the reset signal Vrst, so as to initialize the driving sub-circuit 20. For example, a voltage value of the initial voltage signal Vint is greater than or equal to 0 V.

Based on this, for example, as shown in FIG. 8, the first reset sub-circuit 50 includes a sixth transistor T6. A gate of the sixth transistor T6 is electrically connected to the reset signal terminal RST, a first electrode of the sixth transistor T6 is electrically connected to the initial voltage terminal INT, and a second electrode of the sixth transistor T6 is electrically connected to a first electrode of the light emitting device D. In this way, the sixth transistor T6 is turned on in response to an on level of the reset signal Vrst from the reset signal terminal RST, so as to transmit the initial voltage signal Vint from the initial voltage terminal INT to the first electrode of the light emitting device D.

The second reset sub-circuit 60 includes a seventh transistor T7. A gate of the seventh transistor T7 is electrically connected to the reset signal terminal RST, a first electrode of the seventh transistor T7 is electrically connected to the initial voltage terminal INT, and a second electrode of the seventh transistor T7 is electrically connected to the gate of the driving transistor Td. Thus, the seventh transistor T7 is turned on in response to the reset signal Vrst from the reset signal terminal RST, so that the initial voltage signal Vint from the initial voltage terminal INT is transmitted to the gate of the driving transistor Td, so as to initialize a voltage of the gate of the driving transistor Td.

In this case, as shown in FIG. 9, in a frame, the duration of the off level of the emission control signal Vem is at least 2H, in which 1H is the time for the sub-pixel SP to write the data signal Vdata, and the other 1H is the time required by the first reset sub-circuit 50 and the second reset sub-circuit 60 to initialize the light emitting device D and the gate of the driving transistor Td, respectively. During the 2H, the fourth transistor T4 and the fifth transistor T5 are maintained in the off state in response to the off level of the emission control signal Vem, which may ensure that the gate of the driving transistor Td is initialized and the data signal Vdata is written into the storage capacitor C1.

It will be noted that the transistors mentioned in the above embodiments may be that the first electrodes thereof are drains and the second electrodes thereof are sources; or, the first electrodes are the sources, and the second electrodes are the drains, which is not limited.

In addition, according to different conduction modes of the transistors, the transistors may be divided into enhancement-mode transistors and depletion-mode transistors. According to different substrates required to fabricate the transistors, the transistors may be divided into thin film transistors (TFTs) and metal-oxide-semiconductor field-effect transistors (MOSFETs). According to different types of conductive channels of the transistors, the transistors may be divided into P-type transistors and N-type transistors. In FIGS. 5 and 8, the description is made by taking an example in which the transistors in the pixel driving circuit 101 and the emission time control circuit 102 are enhanced positive-channel metal-oxide-semiconductors (PMOSs), which cannot be regarded as a limitation on the embodiments of the present disclosure.

Figure 10:
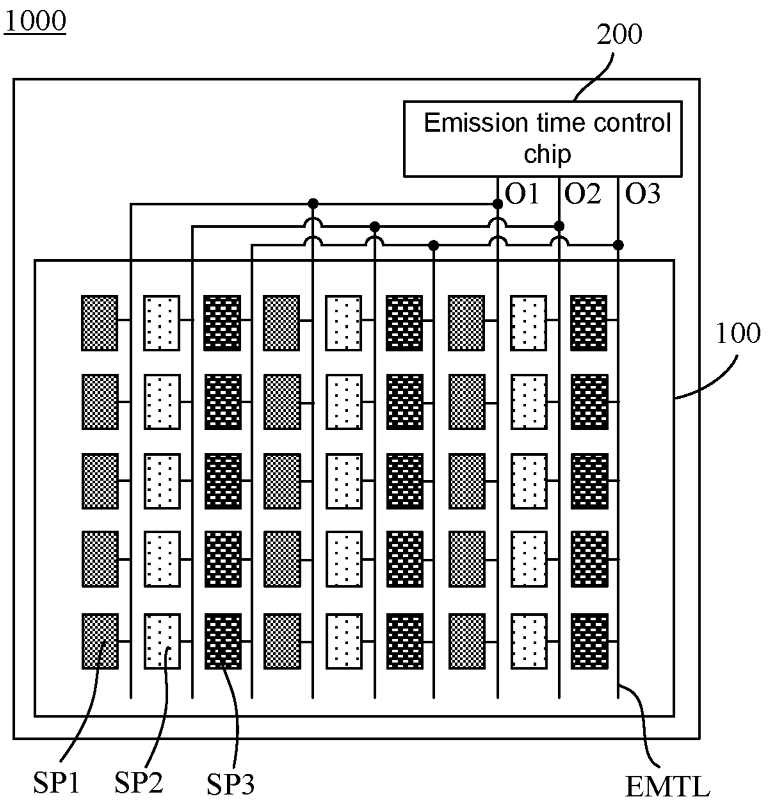
FIG. 10 is a schematic top view of another display apparatus, in accordance with some embodiments.
Figure 11:
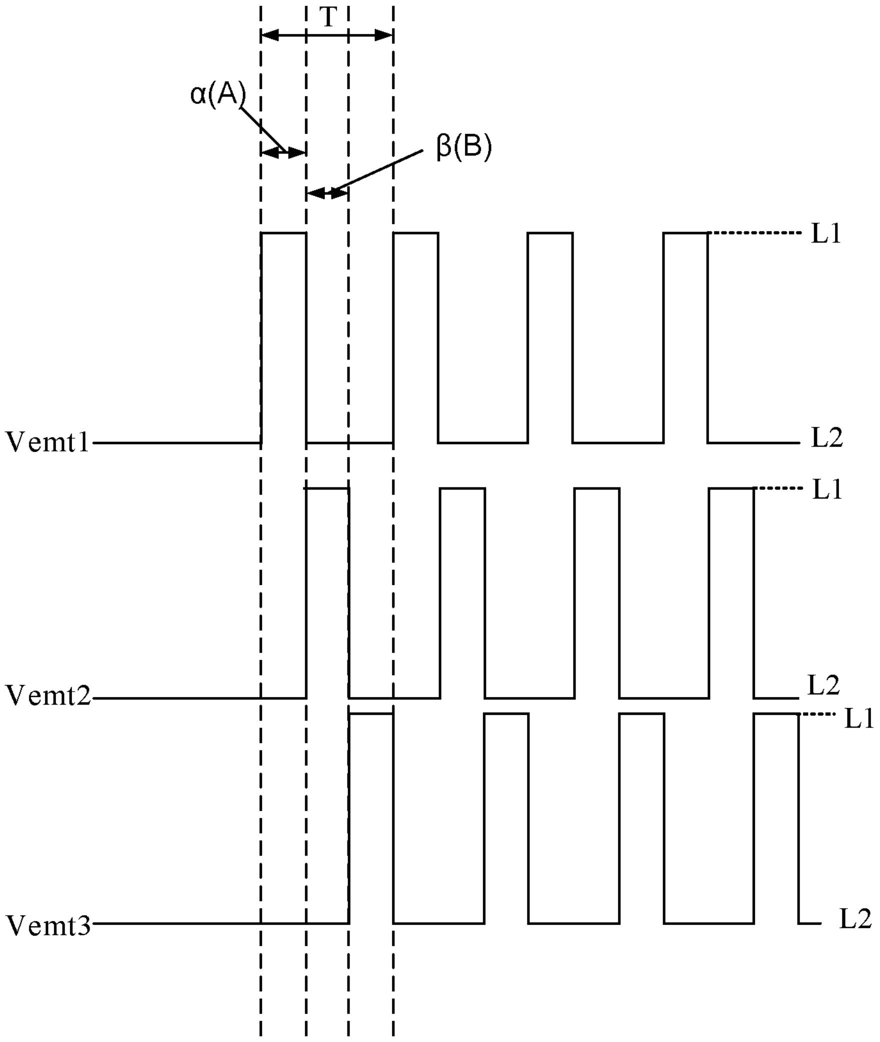
FIG. 11 is a schematic timing diagram showing some other signals, in accordance with some embodiments.

In some embodiments, referring to FIGS. 10 and 11, the plurality of sub-pixels SP included in the display panel 100 includes sub-pixels SP of three colors. The emission time control chip 200 includes three groups of output terminals O, and each group of output terminals O include at least one output terminal O. Emission time control circuits 102 of sub-pixels SP of each color are electrically connected to a respective group of output terminals O. The emission time control chip 200 is configured to transmit emission time control signals Vemt1, Vemt2 and Vemt3 with different phases to the sub-pixels SP of different colors through different groups of output terminals O.

For example, as shown in FIG. 10, the plurality of sub-pixels SP included in the display panel 100 includes a plurality of red sub-pixels SP1, a plurality of green sub-pixels SP2, and a plurality of blue sub-pixels SP3. The emission time control chip 200 is configured to: transmit first emission time control signals Vemt1 to the plurality of red sub-pixels SP1 through a respective group of output terminals O1; transmit second emission time control signals Vemt2 to the plurality of green sub-pixels SP2 through a respective group of output terminals O2; and transmit third emission time control signals Vemt3 to the plurality of blue sub-pixels SP3 through a respective group of output terminals O3.

In this case, as shown in FIG. 11, in a frame, the first emission time control signal Vemt1, the second emission time control signal Vemt2, and the third emission time control signal Vemt3 all have the same number of periods T, and durations of the periods T of the emission time control signals Vemt are equal. That is, waveforms of the emission time control signals Vemt are the same. In each period T, a phase of a first level L1 of the second emission time control signal Vemt2 lags behind a phase of a first level L1 of the first emission time control signal Vemt1 by a first angle $\alpha$, and a phase of a first level L1 of the third emission time control signal Vemt3 lags behind the phase of the first level L1 of the second emission time control signal Vemt2 by a second angle $\beta$.

It will be noted that by setting a phase lagging angle between different emission time control signals Vemt, it may be possible to ensure that in a process of displaying an image by the display apparatus 1000, there are sub-pixels of at least one color in a light emitting state at each moment. As a result, the screen will not appear overall dark, and screen flickering is avoided.

In some embodiments, the emission time control chip 200 is configured to transmit the emission time control signals Vemt with duty cycles that are not exactly the same to the sub-pixels SP of different colors through different groups of output terminals O.

For example, in a case where the emission time control chip 200 is configured to transmit the first emission time control signal Vemt1, the second emission time control signal Vemt2, and the third emission time control signal Vemt3, a proportion of the first level L1 of the first emission time control signal Vemt1 is greater than a proportion of the first level L1 of the third emission time control signal Vemt3, and is less than a proportion of the first level L1 of the second emission time control signal Vemt2.

Here, the proportion of the first level L1 refers to a ratio of a duration of the first level L1 to the duration of the period T.

Generally, since materials of the light emitting devices D of sub-pixels of different colors are different, turn-on speeds of the sub-pixels of different colors are inconsistent, resulting in inconsistent actual emission time (which herein refers to the emission time counted once a preset greyscale value is reached) of the sub-pixels of different colors. As a result, color cast may occur in the display apparatus.

For example, each period T has a duration of 5 us, and the proportion of the first level L1 is 0.2. That is, the durations of the first levels L1 of the first emission time control signal Vemt1, the second emission time control signal Vemt2, and the third emission time control signal Vemt3 are equal. Then a duration of a first level L1 of each emission time control signal Vemt is 1 μs, and a duration of a second level L2 thereof is 4 us. Based on this, if a turn-on time required by the light emitting device D of the red sub-pixel SP1 to reach a preset brightness is 1 μs, and a turn-on time required by the light emitting device D of the green sub-pixel SP2 to reach the preset brightness is 0.5 μs, and a turn-on time required by the light emitting device D of the blue sub-pixel SP3 to reach the preset brightness is 1.5 μs, then an actual emission time of the light emitting device D of the red sub-pixel SP1 is 3 μs, an actual emission time of the light emitting device D of the green sub-pixel SP2 is 3.5 μs, and an actual emission time of the light emitting device D of the blue sub-pixel SP3 is 2.5 μs. In this way, the actual emission times of the red sub-pixel SP1, the green sub-pixel SP2, and the blue sub-pixel SP3 are different, resulting in different luminous brightness, which may cause color cast on the screen.

In the display apparatus 1000, by adjusting the proportions of the first levels of the emission time control signals Vemt input to the sub-pixels SP of different colors, it may be possible to control the actual emission times of the sub-pixels of different colors to be substantially consistent in a case where the turn-on times required by the light emitting devices D corresponding to the sub-pixels of different colors are different, so that it may be possible to avoid the occurrence of color cast in the display apparatus.

In some embodiments, referring to FIG. 10, the emission time control chip 200 includes three output terminals O1, O2, and O3, and the emission time control chip 200 transmits the emission time control signals Vemt to the sub-pixels SP of different colors through the different output terminals O1, O2, and O3.

It will be noted that referring to FIG. 10, a plurality of emission time control lines EMTL may be provided in the display panel 100, and an emission time control circuit 102 in a sub-pixel SP may be electrically connected to a respective output terminal O of the emission time control chip 200 through a respective emission time control line EMTL.

Based on this, for example, emission time control lines EMTL corresponding to the plurality of red sub-pixels SP1 are connected together, emission time control lines EMTL corresponding to the plurality of green sub-pixels SP2 are connected together, and emission time control lines EMTL corresponding to the plurality of blue sub-pixels SP3 are connected together.

In this way, it may be possible to control the luminous brightness of all the red sub-pixels SP1 by providing only one emission time control signal to the emission time control lines EMTL that are connected to the red sub-pixels SP1 and are connected together, control the luminous brightness of all the green sub-pixels SP2 by providing only one emission time control signal to the emission time control lines EMTL that are connected to the green sub-pixels SP2 and are connected together, and control the luminous brightness of all the blue sub-pixels SP3 by providing only one emission time control signal to the emission time control lines EMTL that are connected to the blue sub-pixels SP3 and are connected together. Therefore, a wiring density may be reduced and a circuit design may be simplified.

It will be noted that the emission time control lines corresponding to the sub-pixels of the same color may not be electrically connected together. In this case, the emission time control chip 200 includes a plurality of output terminals O. The emission time control chip 200 may transmit a plurality of emission time control signals Vemt which are the same (i.e., the waveforms and phases are the same) to the plurality of sub-pixels SP of the same color through multiple output terminals O and multiple emission time control lines.

In some embodiments, in a case where the plurality of sub-pixels SP are arranged in an array, referring to FIG. 10, the plurality of emission time control lines EMTL are arranged between a plurality of columns of sub-pixels, and sub-pixels SP of a same color located in a same column of sub-pixels are electrically connected to a corresponding output terminal O through a same emission time control line EMTL.

In some other embodiments, the plurality of emission time control lines EMTL are arranged between a plurality of rows of sub-pixels, and sub-pixels SP of a same color located in a same row of sub-pixels are electrically connected to a corresponding output terminal O through a same emission time control line EMTL.

Some embodiments of the present disclosure further provide a driving method of the display apparatus 1000. In a frame, the driving method includes steps S1 and S2 as follows.

In S1, the pixel driving circuits 101 transmit driving signals SD to the light emitting devices D of the plurality of sub-pixels SP according to image data of an image to be displayed.

In S2, the emission time control chip 200 transmits the emission time control signals Vemt to the emission time control circuits 102 of the plurality of sub-pixels SP, so as to control durations of transmission of the driving signals SD to the light emitting devices D of the plurality of sub-pixels SP.

In some embodiments, in a case where the emission time control signal Vemt has first levels L1 and second levels L2 that are alternately arranged (referring to FIGS. 6 and 9), S2 includes: transmitting, by the emission time control chip 200, emission time control signals Vemt with different phases to the sub-pixels SP of different colors.

Figure 12:
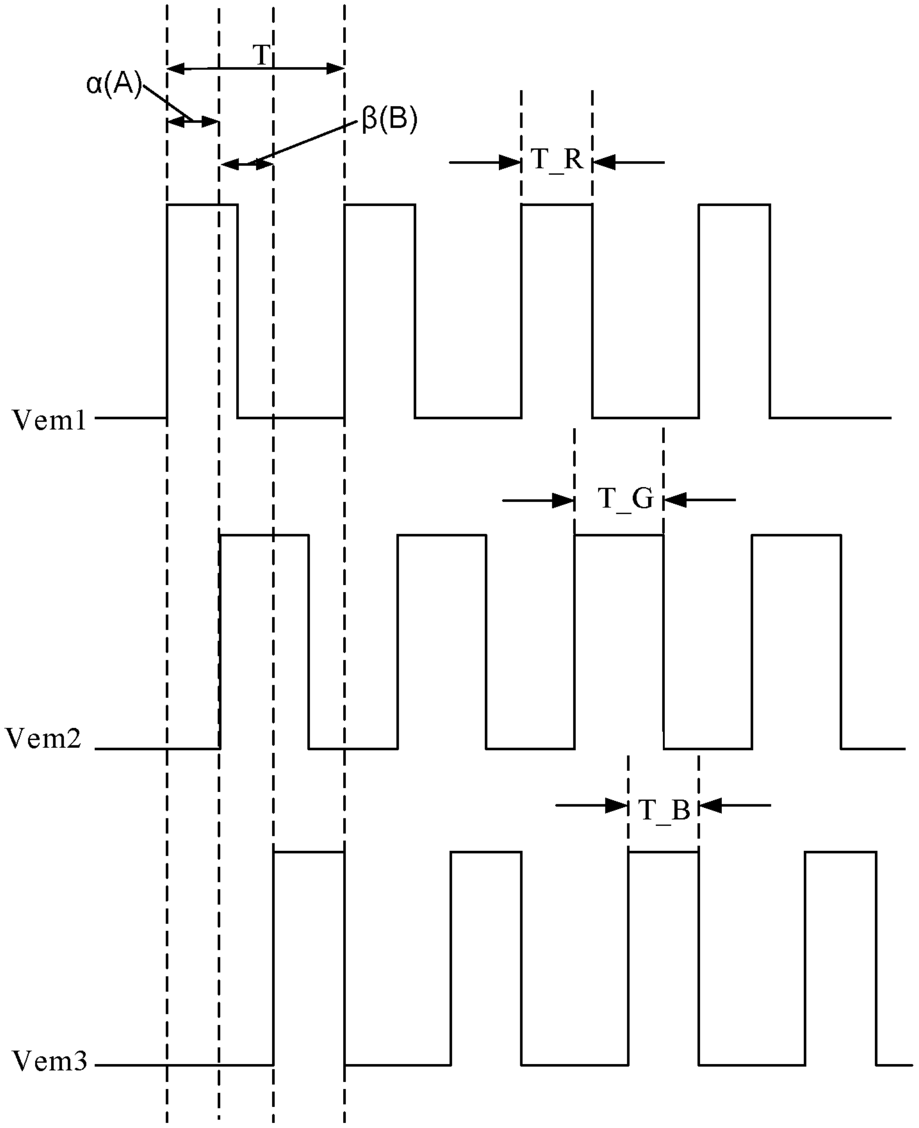
FIG. 12 is a schematic timing diagram showing some other signals, in accordance with some embodiments.

For example, referring to FIGS. 11 and 12, in a case where the plurality of sub-pixels SP include a plurality of red sub-pixels SP1, a plurality of green sub-pixels SP2, and a plurality of blue sub-pixels SP3, transmitting, by the emission time control chip 200, the emission time control signals Vemt with different phases to the sub-pixels SP of different colors includes: transmitting a first emission time control signal Vemt1 to the plurality of red sub-pixels SP1; transmitting a second emission time control signal Vemt2 to the plurality of green sub-pixels SP2; and transmitting a third emission time control signal Vemt3 to the plurality of blue sub-pixels SP3.

Here, in a frame, the first emission time control signal Vemt1, the second emission time control signal Vemt2, and the third emission time control signal Vemt3 all have the same number of a plurality of periods T, durations of the periods T are equal, and each emission time control signal Vemt includes a first level period for outputting the first level L1 and a second level period for outputting the second level L2 in each period T. A phase of a first level period of the second emission time control signal Vemt2 lags behind a phase of a first level period of the first emission time control signal Vemt1 by a first angle $\alpha$, and a phase of a first level period of the third emission time control signal Vemt3 lags behind the phase of the first level period of the second emission time control signal Vemt2 by a second angle $\beta$.

It will be noted that by setting phase lagging angles between different emission time control signals Vemt (e.g., the first angle $\alpha$ and the second angle $\beta$), it may be possible to ensure that there are sub-pixels of at least one color in a light emitting state at each moment in a process of displaying an image by the display apparatus 100, so that the screen will not appear overall dark.

Here, the first angle α and the second angle β may be set according to the turn-on speeds and/or turn-on times of the sub-pixels SP of different colors. For example, referring to FIG. 12, if the turn-on speeds of the green sub-pixels SP2 are relatively high, a value of the first angle α may be set to be relatively large. On the contrary, if the turn-on speeds of the green sub-pixels SP2 are relatively low, the value of the first angle α is set to be relatively small. A setting principle of the second angle β is similar to a setting principle of the first angle α.

Based on this, in some embodiments, a sum of a duration A of the first angle α, a duration B of the second angle β, and a duration γ of the first level period of the third emission time control signal is equal to a duration T1 of the period T, that is, A+B+γ=T1.

In a frame, the first emission time control signal Vemt1, the second emission time control signal Vemt2, and the third emission time control signal Vemt3 each have K periods T. Here, K is a constant related to a resolution of the display apparatus 1000, and K is a positive integer. In addition, a value of K may also be set according to requirements of actual display.

For example, in a case where the duration T1 of the period T is 1.04 ms, if the turn-on times required by the light emitting devices D of the red sub-pixels SP1, the light emitting devices D of the green sub-pixels SP2, and the light emitting devices D of the blue sub-pixels SP3 are consistent, then A=B=T×⅓=347 us.

Based on this, in some embodiments, referring to FIG. 12, the emission time control signals Vemt transmitted to the sub-pixels SP of different colors have the first levels with the proportions that are not exactly the same. That is, the durations of the first level periods of the emission time control signals Vemt received by the sub-pixels SP of different colors are not exactly equal.

For an example, the duration T_R of the first level period of the first emission time control signal Vemt1 transmitted by the emission time control chip 200 to the red sub-pixels SP1, the duration T_G of the first level period of the second emission time control signal Vemt2 transmitted by the emission time control chip 200 to the green sub-pixels SP2, and the duration T_B of the first level period of the third emission time control signal Vemt3 transmitted by the emission time control chip 200 to the blue sub-pixels SP3 are not equal.

For another example, the duration T_R of the first level period of the first emission time control signal Vemt1 transmitted by the emission time control chip 200 to the red sub-pixels SP1 is equal to the duration T_G of the first level period of the second emission time control signal Vemt2 transmitted by the emission time control chip 200 to the green sub-pixels SP2, but both are not equal to the duration T_B of the first level period of the third emission time control signal Vemt3 inputted to the blue sub-pixels SP3.

Based on this, in some embodiments, referring to FIG. 12, in S2, the proportion of the first level of the first emission time control signal Vemt1 is greater than the proportion of the first level of the third emission time control signal Vemt3, and is less than the proportion of the first level of the second emission time control signal Vemt2.

In the above driving method, by adjusting the proportions of the first levels of the emission time control signals Vemt inputted to the sub-pixels SP of different colors, it may be possible to control the actual emission times of the sub-pixels of different colors to be substantially consistent in a case where the turn-on times required by the light emitting devices D corresponding to the sub-pixels of different color are different, so that the occurrence of the color cast in the display apparatus may be avoided. In addition, in general, the blue sub-pixels SP3 are relatively high in a turn-on voltage and relatively low in the turn-on speed, by setting the proportion of the first level of the third emission time control signal Vemt3 corresponding to the blue sub-pixels SP3 to be the minimum, it may be possible to increase the overall light emitting duration (including the light emitting duration before the preset brightness is reached and the light emitting duration after the preset brightness is reached) of the blue sub-pixels SP3, and thus ensure that the actual light emitting duration of the blue sub-pixels SP3 is sufficient.

On this basis, for example, the proportions of the first levels of the emission time control signals Vemt may be respectively set according to the turn-on times required by the sub-pixels SP of different colors, which ensure that the actual emission times of all the sub-pixels tend to be consistent.

A driving process of the sub-pixels SP having the pixel driving circuits 101 shown in FIG. 8 within a frame will be exemplarily described with reference to FIG. 9.

The driving process includes a reset period P0, a scanning period P1, and a light emitting period P2.

In the reset period P0, the first reset sub-circuit 50 transmits an initial voltage signal Vint to the light emitting device D in response to a reset signal Vrst; and the second reset sub-circuit 60 transmits the initial voltage signal Vint to the driving sub-circuit 20 in response to the reset signal Vrst.

For example, in a case where the first reset sub-circuit 50 includes a sixth transistor T6 and a second reset sub-circuit 60 includes a seventh transistor T7, the sixth transistor T6 and the seventh transistor T7 are turned on in response to a low level of the reset signal Vrst, so as to transmit the initial voltage signal Vint to the light emitting device D and a gate of a driving transistor Td.

In the scanning period P1, the writing sub-circuit 10 writes a data signal Vdata into the driving sub-circuit 20 in response to a scan signal Vgate to perform a compensation of a threshold voltage on the driving sub-circuit 20.

For example, in a case where the writing sub-circuit 10 includes a second transistor T2 and a third transistor T3, and the driving sub-circuit 20 includes the driving transistor Td and a storage capacitor C1, the second transistor T2 and the third transistor T3 are turned on in response to a low level (i.e., an on level) of the scan signal Vgate, so that the data signal Vdata is transmitted to the storage capacitor C1 through the turned-on second transistor T2 and third transistor T3, and is stored by the storage capacitor C1. Here, the data signal Vdata stored in the storage capacitor C1 has undergone the compensation of the threshold voltage. The threshold voltage is a threshold voltage of the driving transistor Td.

In the light emitting period P2, in response to the emission control signal Vem, the emission control sub-circuit 30 connects a first voltage terminal VDD to the driving sub-circuit 20 and connects the driving sub-circuit 20 to the emission time control circuit 102; and the driving sub-circuit 20 outputs the driving signal SD according to the data signal Vdata written into the driving sub-circuit 20 and a first voltage signal Vdd from the first voltage terminal VDD in response to connecting the first voltage terminal VDD to the driving sub-circuit 20 and connecting the driving sub-circuit 20 to the emission time control circuit 102 by the emission control sub-circuit 30.

For example, in a case where the emission control sub-circuit 30 includes a fourth transistor T4 and a fifth transistor T5, the fourth transistor T4 and the fifth transistor T5 are turned on in response to a low level (i.e., an on level) of the emission control signal Vem, so that the first voltage terminal VDD is connected to the driving sub-circuit 20 and the driving transistor Td is connected to the first transistor T1. In addition, the driving transistor Td outputs the driving signal SD according to the data signal Vdata written into the storage capacitor C1 and the first voltage signal Vdd. It will be noted that the driving signal SD will be transmitted to the light emitting device D only when the first transistor T1 is in the on state (that is, the emission time control signal is at the second level), that is, the driving transistor Td is connected to the light emitting device D.

Since the emission time control circuit 102 is provided in the display apparatus 1000 and is used for adjusting the luminous brightness of the sub-pixels, a duration of a high level (i.e., a cut-off level) period of the emission control signal Vem may be greater than or equal to 2H. For example, the duration of the high level period of the emission control signal Vem may be 2H, and in this case, a duration of a low level (i.e., a level at which the fourth transistor T4 and the fifth transistor T5 are in an on state) period of the emission control signal Vem may be set to a maximum value, i.e., a difference between a duration of a frame and 2H. In this way, it may be possible to further prevent a plurality of rows of sub-pixels that are continuous and in a non-light-emitting state from occurring with the screen of the display apparatus 1000.

A person of ordinary skill in the art will understand that all or part of the steps in the above method embodiments may be implemented by using hardware related to program instructions. The program instructions may be stored in a computer-readable storage medium. When the programs are executed, the steps included in the above method embodiments are performed. The storage media includes various media capable of storing program codes, such as a read-only memory (ROM), a random-access memory (RAM), a magnetic disk, or an optical disk.

The forgoing descriptions are merely specific implementations of the present disclosure, but the protection scope of the present disclosure is not limited thereto. Any changes or replacements those skilled in the art could conceive of within the technical scope of the present disclosure shall be included in the protection scope of the present disclosure. Therefore, the protection scope of the present disclosure shall be subject to the protection scope of the claims.

What is claimed is:

1. A display apparatus, comprising:

a display panel having a plurality of sub-pixels, each sub-pixel including:

a light emitting device;

a pixel driving circuit configured to provide a driving signal for driving the light emitting device to emit light; and an emission time control circuit electrically connected between the pixel driving circuit and the light emitting device, and configured to connect the pixel driving circuit to the light emitting device in response to an emission time control signal, so as to control a duration of transmission of the driving signal to the light emitting device; and an emission time control chip including at least one output terminal, emission time control circuits of the plurality of sub-pixels being electrically connected to the at least one output terminal; and the emission time control chip being configured to transmit emission time control signals to the emission time control circuits of the plurality of sub-pixels through the at least one output terminal, and the emission time control signals being pulse width modulation signals; wherein the plurality of sub-pixels include sub-pixels of three colors; and the emission time control chip includes three groups of output terminals, each group of output terminals include at least one output terminal, and emission time control circuits of sub-pixels of each color are electrically connected to a respective group of output terminals; and the emission time control chip is configured to transmit emission time control signals with different phases to the sub-pixels of different colors through different groups of output terminals.

2. The display apparatus according to claim 1, wherein the emission time control circuit includes a first transistor, a gate of the first transistor is electrically connected to a respective one of the at least one output terminal, a first electrode of the first transistor is electrically connected to the pixel driving circuit, and a second electrode of the first transistor is electrically connected to the light emitting device.

3. The display apparatus according to claim 1, wherein the plurality of sub-pixels include a plurality of red sub-pixels, a plurality of green sub-pixels, and a plurality of blue sub-pixels; and the emission time control chip is configured to: transmit at least one first emission time control signal to the plurality of red sub-pixels through a respective group of output terminals; transmit at least one second emission time control signal to the plurality of green sub-pixels through a respective group of output terminals; and transmit at least one third emission time control signal to the plurality of blue sub-pixels through a respective group of output terminals; wherein in a frame, the first emission time control signal, the second emission time control signal, and the third emission time control signal have a same number of periods, and durations of the periods are equal; in each period, a phase of a first level of the second emission time control signal lags behind a phase of a first level of the first emission time control signal by a first angle, and a phase of a first level of the third emission time control signal lags behind the phase of the first level of the second emission time control signal by a second angle; and the first level is a level that enables the emission time control circuit to stop transmitting the driving signal.

4. The display apparatus according to claim 1, wherein the emission time control chip is configured to transmit emission time control signals with duty cycles that are not exactly the same to the sub-pixels of different colors through the different groups of output terminals.

5. The display apparatus according to claim 4, wherein the emission time control chip is configured to transmit at least one first emission time control signal, at least one second emission time control signal, and at least one third emission time control signal, a proportion of a first level of the first emission time control signal is greater than a proportion of a first level of the third emission time control signal, and is less than a proportion of a first level of the second emission time control signal; and the first level is a level that enables the emission time control sub-circuit to stop transmitting the driving signal.

6. The display apparatus according to claim 1, wherein the plurality of sub-pixels are arranged in an array;

the display panel further includes a plurality of emission time control lines located between a plurality of columns of sub-pixels, and sub-pixels of a same color located in a same column of sub-pixels are electrically connected to a respective output terminal through a same emission time control line; or the display panel further includes a plurality of emission time control lines located between a plurality of rows of sub-pixels, and sub-pixels of a same color located in a same row of sub-pixels are electrically connected to a respective output terminal through a same emission time control line.

7. The display apparatus according to claim 1, wherein the emission time control chip includes three output terminals, each group of output terminals include an output terminal, and the emission time control chip is configured to transmit the emission time control signals to the sub-pixels of different colors through the different output terminals.

8. A display apparatus, comprising:

a display panel having a plurality of sub-pixels, each sub-pixel including:

a light emitting device;

a pixel driving circuit configured to provide a driving signal for driving the light emitting device to emit light; and an emission time control circuit electrically connected between the pixel driving circuit and the light emitting device, and configured to connect the pixel driving circuit to the light emitting device in response to an emission time control signal, so as to control a duration of transmission of the driving signal to the light emitting device; and an emission time control chip including at least one output terminal, emission time control circuits of the plurality of sub-pixels being electrically connected to the at least one output terminal; and the emission time control chip being configured to transmit emission time control signals to the emission time control circuits of the plurality of sub-pixels through the at least one output terminal, and the emission time control signals being pulse width modulation signals; wherein the display panel further includes a data voltage terminal, a scan signal terminal, a first voltage terminal, and an emission control signal terminal; and the pixel driving circuit includes a writing sub-circuit, a driving sub-circuit, and an emission control sub-circuit;

the writing sub-circuit is electrically connected to the driving sub-circuit, the data voltage terminal, and the scan signal terminal, and is configured to write a data signal from the data voltage terminal into the driving sub-circuit in response to a scan signal from the scan signal terminal to perform a compensation of a threshold voltage on the driving sub-circuit;

the driving sub-circuit is electrically connected to the emission control sub-circuit and the first voltage terminal, and is configured to output the driving signal according to the data signal written into the driving sub-circuit and a first voltage signal from the first voltage terminal in response to the emission control sub-circuit;

the emission control sub-circuit is electrically connected to the emission control signal terminal, the first voltage terminal, and the emission time control circuit, and is configured to: in response to an emission control signal from the emission control signal terminal, connect the first voltage terminal to the driving sub-circuit and connect the driving sub-circuit to the emission time control circuit; and the emission time control circuit is electrically connected to the emission control sub-circuit, and is configured to connect the emission control sub-circuit to the light emitting device in response to the emission time control signal.

9. The display apparatus according to claim 8, wherein the writing sub-circuit includes a second transistor and a third transistor, the driving sub-circuit includes a driving transistor and a storage capacitor, and the emission control sub-circuit includes a fourth transistor and a fifth transistor; and the emission time control circuit includes a first transistor, a gate of the second transistor is electrically connected to the scan signal terminal, a first electrode of the second transistor is electrically connected to the data voltage terminal, and a second electrode of the second transistor is electrically connected to a first electrode of the driving transistor;

a gate of the third transistor is electrically connected to the scan signal terminal, a first electrode of the third transistor is electrically connected to a second electrode of the driving transistor, and a second electrode of the third transistor is electrically connected to a gate of the driving transistor;

the gate of the driving transistor is electrically connected to a first electrode of the storage capacitor, the first electrode of the driving transistor is electrically connected to a second electrode of the fourth transistor, and the second electrode of the driving transistor is electrically connected to a first electrode of the fifth transistor;

a second electrode of the storage capacitor is electrically connected to the first voltage terminal;

a gate of the fourth transistor is electrically connected to the emission control signal terminal, and a first electrode of the fourth transistor is electrically connected to the first voltage terminal; and a gate of the fifth transistor is electrically connected to the emission control signal terminal, and a second electrode of the fifth transistor is electrically connected to a first electrode of the first transistor.

10. A display apparatus, comprising:

a display panel having a plurality of sub-pixels, each sub-pixel including:

a light emitting device;

a pixel driving circuit configured to provide a driving signal for driving the light emitting device to emit light; and an emission time control circuit electrically connected between the pixel driving circuit and the light emitting device, and configured to connect the pixel driving circuit to the light emitting device in response to an emission time control signal, so as to control a duration of transmission of the driving signal to the light emitting device; and an emission time control chip including at least one output terminal, emission time control circuits of the plurality of sub-pixels being electrically connected to the at least one output terminal; and the emission time control chip being configured to transmit emission time control signals to the emission time control circuits of the plurality of sub-pixels through the at least one output terminal, and the emission time control signals being pulse width modulation signals; wherein the pixel driving circuit further includes a first reset sub-circuit and a second reset sub-circuit, and the display panel further includes an initial voltage terminal and a reset signal terminal;

the first reset sub-circuit is electrically connected to the reset signal terminal, the initial voltage terminal, and the light emitting device, and is configured to transmit an initial voltage signal from the initial voltage terminal to the light emitting device in response to a reset signal from the reset signal terminal; and the second reset sub-circuit is electrically connected to the reset signal terminal, the initial voltage terminal, and the driving sub-circuit, and is configured to transmit the initial voltage signal to the driving sub-circuit in response to the reset signal.

11. The display apparatus according to claim 10, wherein the driving sub-circuit includes a driving transistor and a storage capacitor, the first reset sub-circuit includes a sixth transistor, a gate of the sixth transistor is electrically connected to the reset signal terminal, a first electrode of the sixth transistor is electrically connected to the initial voltage terminal, and a second electrode of the sixth transistor is electrically connected to the light emitting device; and the second reset sub-circuit includes a seventh transistor, a gate of the seventh transistor is electrically connected to the reset signal terminal, a first electrode of the seventh transistor is electrically connected to the initial voltage terminal, and a second electrode of the seventh transistor is electrically connected to a gate of the driving transistor.

12. A driving method of the display apparatus according to claim 1, the driving method comprising: in a frame:

transmitting, by pixel driving circuits, driving signals to light emitting devices of the plurality of sub-pixels according to image data of an image to be displayed; and transmitting, by the emission time control chip, the emission time control signals to the emission time control circuits of the plurality of sub-pixels, so as to control durations of transmission of the driving signals to the light emitting devices of the plurality of sub-pixels; wherein the emission time control signals are pulse width modulation signals; wherein the emission time control signals each have first levels and second levels that are alternately arranged, the first levels are each a level that enables the emission time control circuit to stop transmitting the driving signal, and the second levels are each a level that enables the emission time control circuit to transmit the driving signal; and the plurality of sub-pixels include sub-pixels of three colors; and transmitting, by the emission time control chip, the emission time control signals to the emission time control circuits of the plurality of sub-pixels includes:

transmitting, by the emission time control chip, the emission time control signals with different phases to the sub-pixels of different colors.

13. The driving method according to claim 12, wherein the plurality of sub-pixels include a plurality of red sub-pixels, a plurality of green sub-pixels, and a plurality of blue sub-pixels; and transmitting, by the emission time control chip, the emission time control signals with different phases to the sub-pixels of different colors includes:

transmitting at least one first emission time control signal to the plurality of red sub-pixels;

transmitting at least one second emission time control signal to the plurality of green sub-pixels; and transmitting at least one third emission time control signal to the plurality of blue sub-pixels; wherein in a frame, the first emission time control signal, the second emission time control signal, and the third emission time control signal have a same number of periods, durations of the periods are equal, and each period includes a first level period for outputting of a first level and a second level period for outputting of a second level; and a phase of a first level period of the second emission time control signal lags behind a phase of a first level period of the first emission time control signal by a first angle, and a phase of a first level period of the third emission time control signal lags behind the phase of the first level period of the second emission time control signal by a second angle.

14. The driving method according to claim 13, wherein a sum of a duration of the first angle, a duration of the second angle, and a duration of the first level period of the third emission time control signal is equal to the duration of the period; and in a frame, the first emission time control signal, the second emission time control signal, and the third emission time control signal each have K periods, K is a constant related to a resolution of the display apparatus, and K is a positive integer.

15. The driving method according to claim 12, wherein the emission time control signals transmitted to the sub-pixels of different colors have first levels with proportions that are not exactly the same.

16. The driving method according to claim 15, wherein the at least one first emission time control signal is transmitted to the plurality of red sub-pixels, the at least one second emission time control signal is transmitted to the plurality of green sub-pixels, and the at least one third emission time control signal is transmitted to the plurality of blue sub-pixels, a proportion of a first level of the first emission time control signal is greater than a proportion of a first level of the third emission time control signal, and is less than a proportion of a first level of the second emission time control signal.

17. A driving method of the display apparatus according to claim 1, the driving method comprising: in a frame:

transmitting, by pixel driving circuits, driving signals to light emitting devices of the plurality of sub-pixels according to image data of an image to be displayed; and transmitting, by the emission time control chip, the emission time control signals to the emission time control circuits of the plurality of sub-pixels, so as to control durations of transmission of the driving signals to the light emitting devices of the plurality of sub-pixels; wherein the emission time control signals are pulse width modulation signals; wherein the display panel further includes a data voltage terminal, a scan signal terminal, a first voltage terminal, an emission control signal terminal, an initial voltage terminal, and a reset signal terminal; and a pixel driving circuit of each sub-pixel includes a writing sub-circuit, a driving sub-circuit, an emission control sub-circuit, a first reset sub-circuit, and a second reset sub-circuit; the writing sub-circuit is electrically connected to the driving sub-circuit, the data voltage terminal, and the scan signal terminal; the driving sub-circuit is electrically connected to the emission control sub-circuit and the first voltage terminal; the emission control sub-circuit is electrically connected to the emission control signal terminal, the first voltage terminal, and the emission time control circuit; the first reset sub-circuit is electrically connected to the reset signal terminal, the initial voltage terminal, and the light emitting device of the sub-pixel; and the second reset sub-circuit is electrically connected to the reset signal terminal, the initial voltage terminal, and the driving sub-circuit; and in a frame, each sub-pixel has a reset period, a scanning period, and a light emitting period in sequence; and transmitting, by the pixel driving circuits, the driving signals to the light emitting devices of the plurality of sub-pixels according to the image data of the image to be displayed includes:

in the reset period, transmitting, by the first reset sub-circuit, an initial voltage from the initial voltage terminal to the light emitting device in response to a reset signal from the reset signal terminal; and transmitting, by the second reset sub-circuit, the initial voltage to the driving sub-circuit in response to the reset signal;

in the scanning period, writing, by the writing sub-circuit, a data signal from the data voltage terminal into the driving sub-circuit in response to a scan signal from the scan signal terminal to perform a compensation of a threshold voltage on the driving sub-circuit; and in the light emitting period, in response to an emission control signal from the emission control signal terminal, connecting, by the emission control sub-circuit, the first voltage terminal to the driving sub-circuit, and the driving sub-circuit to the emission time control circuit; and outputting, by the driving sub-circuit, the driving signal according to the data signal written into the driving sub-circuit and a first voltage signal from the first voltage terminal in response to the emission control sub-circuit, wherein a duration of an off level of the emission control signal is greater than or equal to 2H, and H represents a duration required by the sub-pixel to write the data signal.

* * * * *